US012226989B2

(12) United States Patent
Rezab

(10) Patent No.: US 12,226,989 B2
(45) Date of Patent: Feb. 18, 2025

(54) ABRASION RESISTANT MATERIAL AND MANUFACTURING METHOD

(71) Applicant: adidas AG, Herzogenaurach (DE)

(72) Inventor: Axel Daniel Rezab, Nuremberg (DE)

(73) Assignee: adidas AG, Herzogenaurach (DE)

( * ) Notice: Subject to any disclaimer, the term of this patent is extended or adjusted under 35 U.S.C. 154(b) by 413 days.

(21) Appl. No.: 16/883,510

(22) Filed: May 26, 2020

(65) Prior Publication Data

US 2020/0391476 A1 Dec. 17, 2020

(30) Foreign Application Priority Data

Jun. 14, 2019 (DE) ...................... 10 2019 208 734.5

(51) Int. Cl.
  *B32B 5/02* (2006.01)
  *A43B 1/04* (2022.01)
  *A43B 23/02* (2006.01)
  *B32B 5/26* (2006.01)
  (Continued)

(52) U.S. Cl.
CPC .......... *B32B 5/026* (2013.01); *A43B 23/0235* (2013.01); *B32B 5/26* (2013.01); *D04B 1/12* (2013.01); *D04B 21/04* (2013.01); *B32B 2255/02* (2013.01); *B32B 2307/554* (2013.01); *D10B 2331/04* (2013.01); *D10B 2331/10* (2013.01); *D10B 2401/041* (2013.01); *D10B 2401/061* (2013.01);
(Continued)

(58) Field of Classification Search
CPC ....... B32B 37/144; B32B 7/028; B32B 5/026; B32B 5/26; B32B 2255/02; B32B 2307/554; A43B 1/04; A43B 23/0235; D10B 2501/043
See application file for complete search history.

(56) References Cited

U.S. PATENT DOCUMENTS 6,659,020 B1 * 12/2003 Ball .......................... B32B 5/18
  108/57.28
9,682,512 B2   6/2017 Dua et al.
(Continued)

FOREIGN PATENT DOCUMENTS

CN       101856163 A    10/2010
DE    102016005593 A1   11/2017
(Continued)

OTHER PUBLICATIONS

European Search Report in European Application No. 20179311.4, mailed Dec. 22, 2020 (11 pages).
(Continued)

*Primary Examiner* — Jeremy R Pierce
(74) *Attorney, Agent, or Firm* — Sterne, Kessler, Goldstein & Fox P.L.L.C.

(57) ABSTRACT

An abrasion-resistant material includes a first layer including a first textile material and a second layer including a second textile material. The second layer is arranged on the first layer, wherein the first layer and the second layer are at least partially heat bonded to each other. The first textile material exhibits a first shrinkability and the second textile material exhibits a second shrinkability, wherein the first shrinkability is greater than the second shrinkability, when at least partially heat bonding the first layer and the second layer.

15 Claims, 4 Drawing Sheets

(51) Int. Cl.
*D04B 1/12* (2006.01)
*D04B 21/04* (2006.01)
(52) U.S. Cl.
CPC .......................... *D10B 2403/0112* (2013.01); *D10B 2501/043* (2013.01); *Y10T 442/488* (2015.04)

(56) References Cited

U.S. PATENT DOCUMENTS

| | | | | |
|---|---|---|---|---|
| 2002/0127361 | A1* | 9/2002 | Sandt | G09F 3/10 428/40.1 |
| 2012/0279260 | A1* | 11/2012 | Dua | D04B 21/08 66/171 |
| 2013/0255103 | A1 | 10/2013 | Dua et al. | |
| 2013/0269209 | A1 | 10/2013 | Lang et al. | |
| 2013/0312284 | A1* | 11/2013 | Berend | A43B 23/0245 36/83 |
| 2017/0203539 | A1* | 7/2017 | Sommer | B32B 37/06 |
| 2017/0251734 | A1 | 9/2017 | Hurren et al. | |
| 2018/0135213 | A1* | 5/2018 | Bell | A43B 1/0009 |
| 2020/0022456 | A1* | 1/2020 | Brinkman | A43B 1/04 |

FOREIGN PATENT DOCUMENTS

| | | |
|---|---|---|
| DE | 10 2017 223 743 A1 | 6/2019 |
| EP | 0747518 B1 | 5/2002 |
| KR | 20160019725 A | 2/2016 |
| WO | 98/49967 A1 | 11/1998 |
| WO | 00/22213 A1 | 4/2000 |
| WO | 2012/151408 A2 | 11/2012 |
| WO | 2017/142857 A1 | 8/2017 |
| WO | WO2018/163090 A1 | 9/2018 |

OTHER PUBLICATIONS

Office Action directed to related German Patent Application No. 10 2019 208 734.5, mailed Feb. 6, 2024, 8 pages.

* cited by examiner

ABRASION RESISTANT MATERIAL AND MANUFACTURING METHOD

TECHNICAL FIELD

The present invention relates to an abrasion resistant material as well as to a method of manufacturing such an abrasion resistant material, which is in particular suitable for sports equipment, apparel and footwear.

TECHNICAL BACKGROUND

Textile fabrics used for sports apparel and footwear provide a large variety of applications and designs. For example, an upper of a shoe or a piece of apparel can be manufactured from various textile fabrics providing a rich variety of look and feel while also being lightweight, which is especially important for competitive athletes. A large proportion of materials used for textile fabrics are made from synthetic fibers having thermoplastic properties. Over the past years methods have been developed to bond such thermoplastic textiles without the need of sewing or gluing using heat treatments.

For instance, KR 2016 0019 725 A relates to a woven adhesive fabric with circular knit manufactured by weaving the yarn and TPU fibers with a hot-melt resin coated with a circular knit. U.S. Pat. No. 9,682,512 B2 is directed to methods of joining textiles and other elements incorporating a thermoplastic polymer material. Various fused regions may be formed in these elements through thermal bonding processes to modify various properties that include permeability, durability and stretch-resistance. Further, EP 0 747 518 B1 relates to a woven fabric used for making various textile products such as bags, which enables strong bond strength to be achieved with heat bonding yet with no need of sewing at least two woven fabric pieces.

However, existing textile materials comprising synthetic fibers having thermoplastic properties and known textile materials have various disadvantages for the usage in e.g. sports apparel. For instance, high durability and low wear and tear of sports garments or shoes resulting in a longer lifecycle and thus in conserving of resources and reduction of pollution is often considered as less important. This relates especially to lightweight sports equipment and footwear, in which the surfaces are often exposed to high stress and abrasion during sportive activities e.g. sliding a part of a shoe on the ground.

It is therefore a problem underlying the present invention to improve the outlined disadvantages at least partly and provide an improved material and a method of manufacturing such an improved material having a high abrasion-resistance but at the same time being flexible and lightweight.

SUMMARY OF THE INVENTION

The above-mentioned problem is at least partly solved by the subject matter of described herein In an embodiment, the present invention provides an abrasion-resistant material, including a first layer including a first textile material and a second layer including a second textile material. The second layer is arranged on the first layer, wherein the first layer and the second layer are at least partially heat bonded to each other. The first textile material exhibits a first shrinkability and the second textile material exhibits a second shrinkability, wherein the first shrinkability is greater than the second shrinkability, when heat bonding the first layer and the second layer at least partially.

The present invention therefore provides an abrasion resistant material that may be used on or attached to sports components particularly but not limited to footwear, apparel, sports equipment and similar. Moreover, the abrasion resistant material provides a material with high resistance to wear and tear without being stiff, which may simplify processing and may increase the possible field of application. In particular, the different shrinkability of the first and second textile layer causes the emergence of a three-dimensionally shaped abrasion resistant material exhibiting the above-mentioned improved properties. This three-dimensional shape is obtained when heat bonding the first layer and the second layer due to the different shrinkabilities of the first and second textile materials.

In some embodiments of the present invention, at least a part of the first and/or the second layer is warp knitted, weft knitted, or woven or any combination thereof. Therefore, by using various kinds of textile working techniques, the abrasion resistant material may be specifically adapted to its intended application. For example, woven textiles are in general stiffer than knitted textiles, whereas knitted textiles, in contrast, exhibit generally more stretchability. By varying the respective textile working techniques for the first and second layer or using the same technique and combining those depending on the needed properties, a versatile abrasion resistant material may be provided.

Further, the first textile material may include a first yarn and the second textile material may include a second yarn. One aspect of the present invention is the different shrinkability of the first textile material and the second textile material. The degree of the occurring shrinkability of both materials may be controlled by choosing a first and second yarn accordingly. For example, the first yarn may have a higher shrinkability than the second yarn during heat treatment, for example during a heat bonding process.

In some embodiments, the first yarn includes a first thermoplastic material, wherein the term thermoplastic material may denote a plastic polymer material that becomes pliable or moldable at a certain temperature and solidifies upon cooling. This process may lead to a change of material properties, which may result in a material with a high abrasion resistance. The first yarn may include only the first thermoplastic material, which may provide a high-quality yarn at a reasonable price as there is no need to combine different materials accurately during the manufacture of the yarn. Moreover, the first yarn may be a monofilament yarn, which may be a 100% TPU monofilament yarn.

In some embodiments, the second yarn includes a second thermoplastic material and a polyester. The polyester may also be a thermoplastic material or in some embodiments may be thermoset. By selecting these two materials for the manufacture of the second yarn, the different melting points and further properties may provide a variety of material characteristics with high performance for the manufacture of the second textile material.

In some embodiments, the second yarn includes a polyester core and a second thermoplastic material coating. This core-sheath structure may combine the individual benefits of each material joined into one yarn. For example, polyester is known to have a high tenacity and a high E-modulus compared to other industrial fibers, which in the second yarn is brought together with the pliable and moldable properties of the second thermoplastic material.

In some embodiments, the second textile material melts at least partially during the heat bonding. This partial melting may lead to a softening of the sheath layer of the second yarn, which may result in a fusion of neighboring portions of the second yarn within the second layer as well as a fusion of portions of the second layer with portions of the first layer. The polyester core may remain solid during the partial melting of the second textile material.

The diameter of the second yarn may be identical to or larger than the diameter of the first yarn. By using a fine and low denier yarn for the manufacture of the first layer, small mesh sizes may be used to create a homogenous looking first layer. On the other hand, the at least identical or larger diameter of the second yarn compared to the first yarn may provide a yarn, which enables to form various patterns and creative designs. For example, the second layer may have a plurality of openings larger than an average mesh size of the second layer. Additionally or alternatively, the plurality of openings of the second layer may be larger on average than the mesh size of the first layer. This may enable in addition to the above-mentioned features a design of the abrasion resistant material, in which the first layer may be visible through the plurality of openings of the second layer. Therefore, by using multiple colors for the first and second layer, a high-performance abrasion resistant material may be provided with the possibility to create various interesting patterns and designs. In addition, the openings of the second layer may add to the breathability of the abrasion-resistant material. Thus, a lightweight and breathable, yet abrasion-resistant material may be obtained.

In some embodiments, the first textile material exhibits a first stretchability and the second textile material exhibits a second stretchability; wherein the first stretchability is greater than the second stretchability. Therefore, by combining materials with a different stretchability prior to heat bonding, a versatile abrasion resistant material may be provided, which may on the one hand be flexible and easily shaped but may on the other hand also manifest a high tear resistance when attached for example to a stretch piece of apparel or part of a shoe.

In another embodiment, a method of manufacturing an abrasion-resistant material is provided. The method includes providing a first layer including a first textile material, providing a second layer including a second textile material and arranging the second layer on the first layer. Further, the method comprises the step of heat bonding both layers at least partially to each other, wherein the first textile material exhibits a first shrinkability and the second textile material exhibits a second shrinkability, wherein the first shrinkability is greater than the second shrinkability, when heat bonding the first layer and the second layer at least partially.

Therefore, a method of manufacturing a material with a high abrasion resistance is provided. The different shrinkability of the first and second textile materials in combination with an application dependent heat treatment during heat bonding may be adapted to provide a material with increasing or decreasing gradient in abrasion resistance and/or a variable degree of abrasion resistance. The heat bonding may include applying a pressure of up to 1 bar at a temperature between 100 to 200° C. for a time duration of at least 10 seconds. In some embodiments the heat bonding may include applying a pressure of 0.5 to 0.7 bar at a temperature between 150 to 180° C. for a time duration of 20 to 40 seconds. By varying the different parameters of the heat bonding, such as time, temperature and/or pressure, a method to manufacture a material that can achieve a wide range of abrasion resistance and durability depending on how it is heat-treated without being stiff is provided.

In some embodiments, a method to insert a non-stick protective foil between the first layer and the heat press and/or between the second layer and the heat press is provided. The protective foil may be inserted before heat bonding, i.e. before a heat pressing operation is carried out. Using a protective foil, such as e.g. a Teflon®-coated foil or similar between the heat press and the first and/or second layer enables a method to manufacture an abrasion resistant material in which the respective at least one layer may be prevented from sticking onto the surface of the heat press after the heat pressing operation is completed, ensuring a high quality of the resulting product. It may be noted that the term "and/or" used in combination with e.g. two features of the present invention relates to a combination of "only the first feature", or "only the second feature" or "the first and the second feature".

The method may further include removing the abrasion-resistant material from the heat press within a period shorter than 10% of the time duration of the heat bonding, after the time duration of the heat bonding expired. For example, heat bonding the first and second layer for a time duration of 30 seconds would demand to remove the abrasion-resistant material after this time duration expired within less than 3 seconds. This may prevent the first or second layer from sticking to the foil after the heat bonding and during a subsequent cooling down to room temperature.

In some embodiments, a method is provided, wherein the heat bonding causes a shrinking of the first and the second layer. The term shrinking may define a process of a reduction of a surface area of the first and second layer including the first and second textile material. The reduction of a surface area may be used to characterize the size of the shrinkability of a layer comprising a textile material. Additionally or alternatively, a method is provided, wherein the heat bonding causes a first change of surface area of the first layer and a second change of surface area of the second layer. In some embodiments the absolute value of the first change of surface area is greater than the absolute value of the second change of surface area. It should be noted that the amount of shrinking and/or the amount of change of surface area of the second layer including the second textile material may also be zero.

Moreover, the above described method of manufacturing an abrasion resistant material may also include a method, wherein the first textile material exhibits a first stretchability and the second textile material exhibits a second stretchability, wherein the first stretchability is greater than the second stretchability.

In a further embodiment, an abrasion-resistant material manufactured according to anyone of the methods described above is provided.

SHORT DESCRIPTION OF THE FIGURES

Aspects of the present invention are descried in more detail in the following by reference to the accompanying figures.

DETAILED DESCRIPTION OF SOME EXEMPLARY EMBODIMENTS

In the following, exemplary embodiments of the present invention are described in more detail with reference to an abrasion resistant material. While specific feature combinations are described in the following with respect to the exemplary embodiments of the present invention, it is to be understood that the disclosure is not limited to such embodiments. In particular, not all features have to be present for realizing the invention, and the embodiments may be modified by combining certain features of one embodiment with one or more features of another embodiment.

Figure 1A:
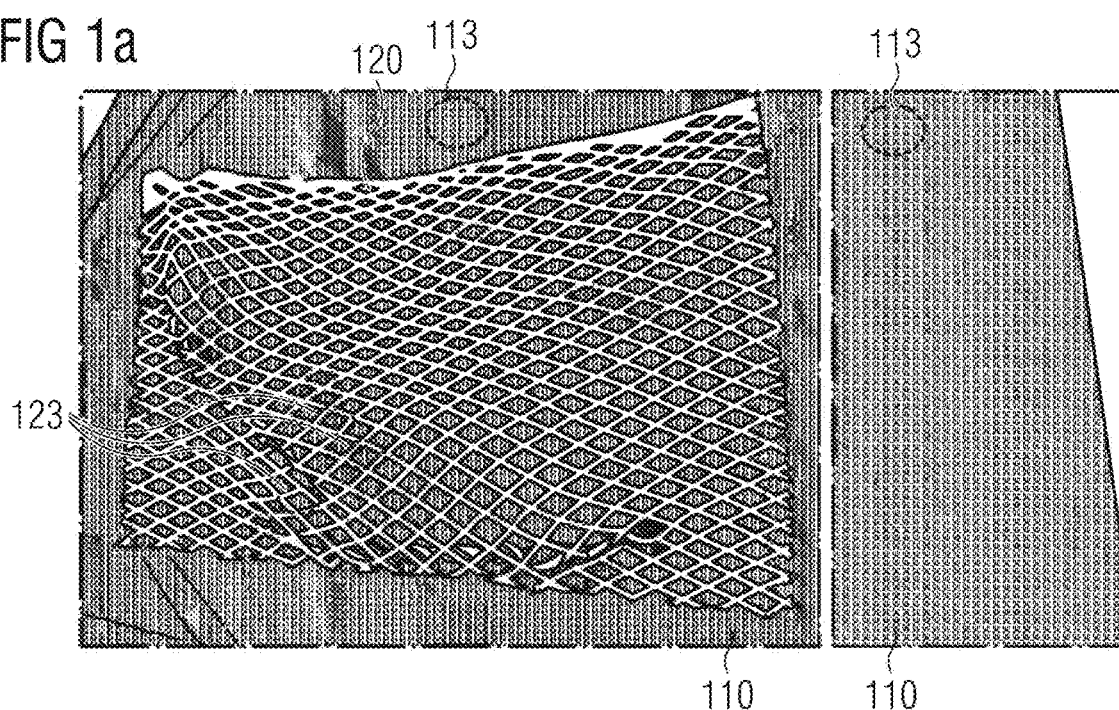
FIG. 1a shows an illustration of a second layer arranged on a first layer prior to heat bonding.

FIG. 1a depicts two layers 110, 120 of textile material arranged loosely on top of each other prior to heat bonding. The first layer 110 at the bottom includes a first textile material and may be composed of a uniform net of meshes 113, which is also depicted in an enlarged illustration on the right side of FIG. 1a. The textile material of the first layer 110 may be a thermoplastic material, in particular a thermoplastic polyurethane, TPU. The second layer 120 on top includes a second textile material and may be composed of openings 123 larger than an average mesh size (not shown) of this layer or the mesh size 113 of the first layer 110. The textile material of the second layer 120 may be a polyester core with a thermoplastic coating. In some embodiments, the thermoplastic coating may include a thermoplastic material different to the thermoplastic material of the first layer 110. In another embodiment, the thermoplastic coating may be a TPU.

The first textile material may exhibit a larger stretchability than the second textile material. One way of characterizing the stretchability of a textile material is to pull apart a stripe having a predefined dimension of textile material from both ends, using a force that is smaller than a force needed to tear the textile material. By characterizing two different textile materials having identical predefined dimensions and applying the same force, a comparison of the resulting length of the textile materials enables to determine which lengthens more and thus is defined to have a larger stretchability.

The first textile material may exhibit a larger shrinkability than the second textile material, when heat bonding both layers 110, 120 at least partially. One way of characterizing the shrinkability of a textile material is to determine the change in surface area of the textile material during an application of heat. By starting with two different textile materials having the same size of surface area and applying the same temperature and pressure to both textile materials for the same amount of time, the one with a smaller resulting surface area is defined to have a larger shrinkability.

In some embodiments, the aspect of the larger shrinkability of the first textile material compared to the second textile material may lead to a strong bonding between both layers 110, 120 when heat bonded at least partially to each other. It may be noted that the shrinkability of the second layer 120 may also be zero. Furthermore, if the methods are performed in accordance with the present invention, the resulting material may provide a versatile abrasion resistant material that is flexible and can be easily shaped.

Figure 1B:
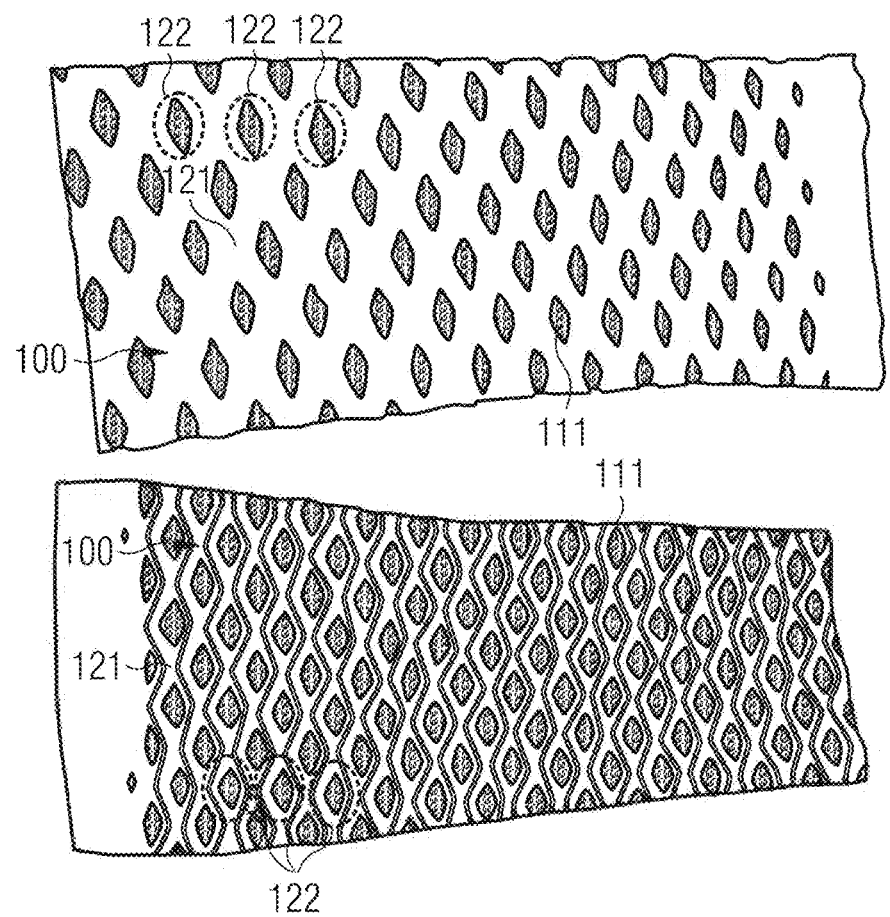
FIG. 1b shows two embodiments illustrating the first and second layer heat bonded to each other.

FIG. 1b depicts an illustration of the first 111 and second 121 layer shown in FIG. 1a after heat bonding. The heat bonding may include applying a pressure up to 1 bar at a temperature of 100° C. to 200° C. for a time duration of at least 10 seconds. During the heat bonding of both layers 111, 121, the second textile material may melt at least partly, which may lead to a puffed or swollen appearance of the second textile material as depicted in FIG. 1b. Additionally or alternatively, the first textile material may shrink during the heat bonding. These two aspects, partly melting of the second textile material and shrinking of the first textile material may create a strong bond between both layers 111, 121 and may form the abrasion resistant material 100 of the present invention.

By varying the parameters of the heat bonding, namely temperature, pressure and time, different effects and looks may be achieved. For example, an increase in temperature may lead to a higher degree of melting of the second textile material resulting in a more puffed or swollen look and a stronger degree of abrasion resistance. Similar effects may be possible by an increase of time duration. In some embodiments the heat bonding may be applied to an entire arrangement of two layers 111, 121 as depicted in FIG. 1b, wherein the above-mentioned effects may be achieved homogeneously on the entire arrangement. The openings 122 of the second layer 121 may still be larger than the average mesh size of the second layer 121 after heat bonding in some embodiments.

Figure 2:
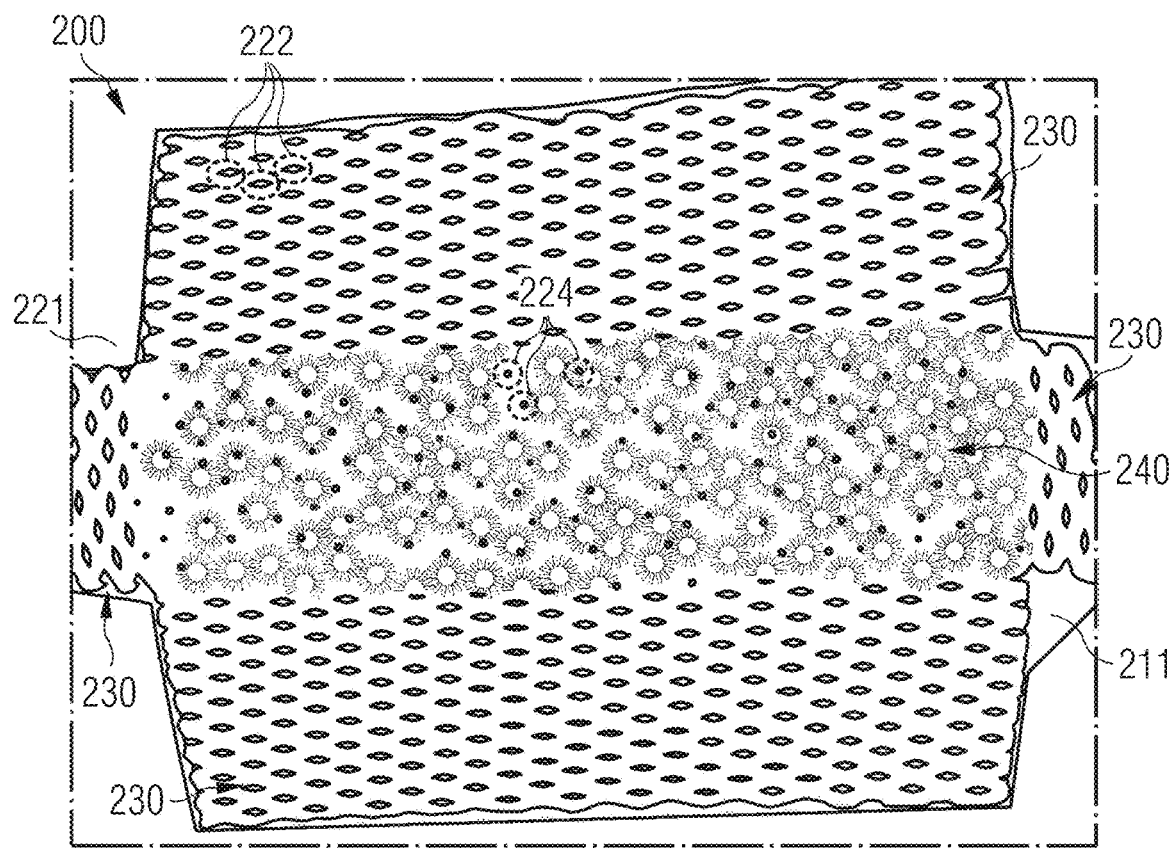
FIG. 2 shows another embodiment illustrating a different first and second layer heat bonded to each other.

In another embodiment, heat bonding using different parameters may be applied to various regions of an arrangement of the two layers 211, 221, wherein the above-mentioned effects may thus appear differently at the various regions. For example, FIG. 2 depicts an embodiment that includes two regions 230, 240. A first region 240 in a central part of the arrangement and a second region 230 around the central part. Using a higher temperature and/or a longer duration of the heat bonding applied to the first region 240 when compared to the second region 230, may result in a higher abrasion resistance and a more puffed or swollen appearance of the second textile material. Various embodiments may include a different number of regions arranged differently than depicted in FIG. 2. The openings 224 of the first region 240 of the second layer 221 may have a different size and shape than the openings 222 of the second region 230 of the second layer 221. In some embodiments the transition between various regions 230, 240 may be abrupt, wherein in other embodiments the transition may be gradually or smooth. This enables not only to vary the intended amount of abrasion resistance for different parts of e.g. a shoe or sports apparel, but also provides a method to create different looks and appearances of e.g. a shoe or sports apparel having the abrasion resistant material 200.

Figure 3:
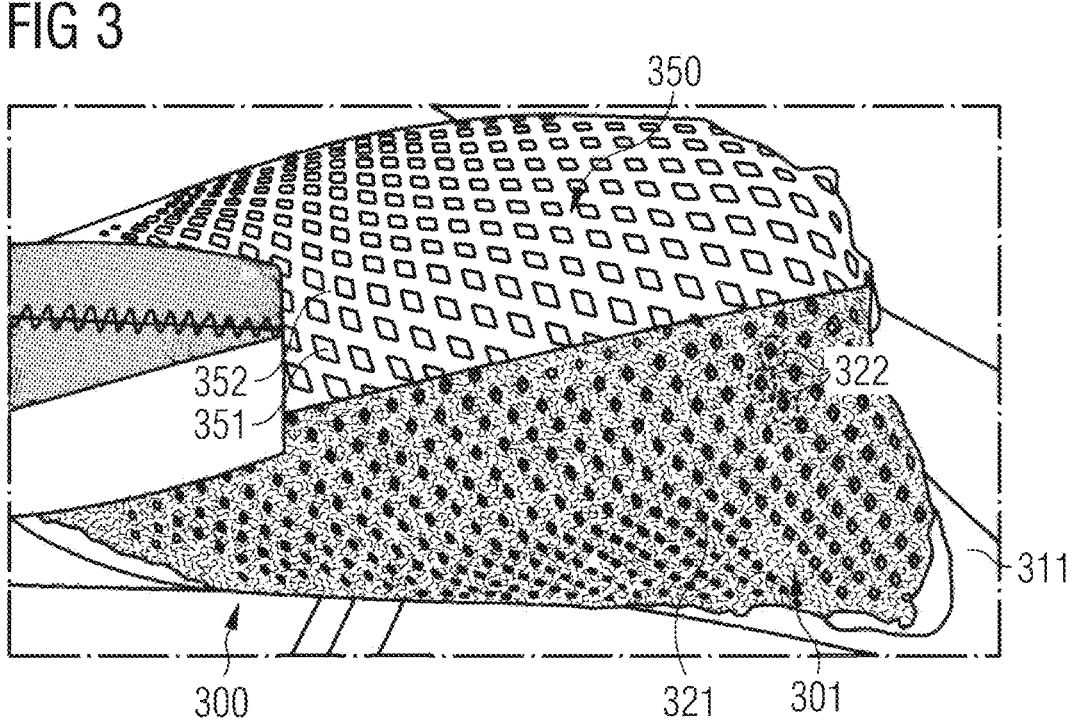
FIG. 3 shows a further embodiment illustrating an abrasion resistant material in direct comparison to a known standard material.

FIG. 3 depicts another embodiment that includes a third region 301 and a fourth region 350, wherein the transition between both regions is abrupt. The third region 301 includes the abrasion resistant material 300 with a puffed or swollen appearance and openings 322 in the second layer 321. The openings 322 may enable a translucent effect in which parts of the first layer 311 are visible and therefore may provide a method to create different designs and looks using various colors to manufacture the abrasion resistant material 300. The fourth region 350 includes a second layer 352, which is identical to the second layer 321 of the third region 301. However, the first layer 351 of the fourth region 350 may be manufactured from a standard material not exhibiting the first shrinkability. Therefore, heat bonding such a first layer 351 of a standard material and the second layer 352 of the present invention may not provide a material with a high abrasion resistance as depicted in the fourth region 350 of FIG. 3 with a non-puffed or non-swollen appearance.

Figure 4:
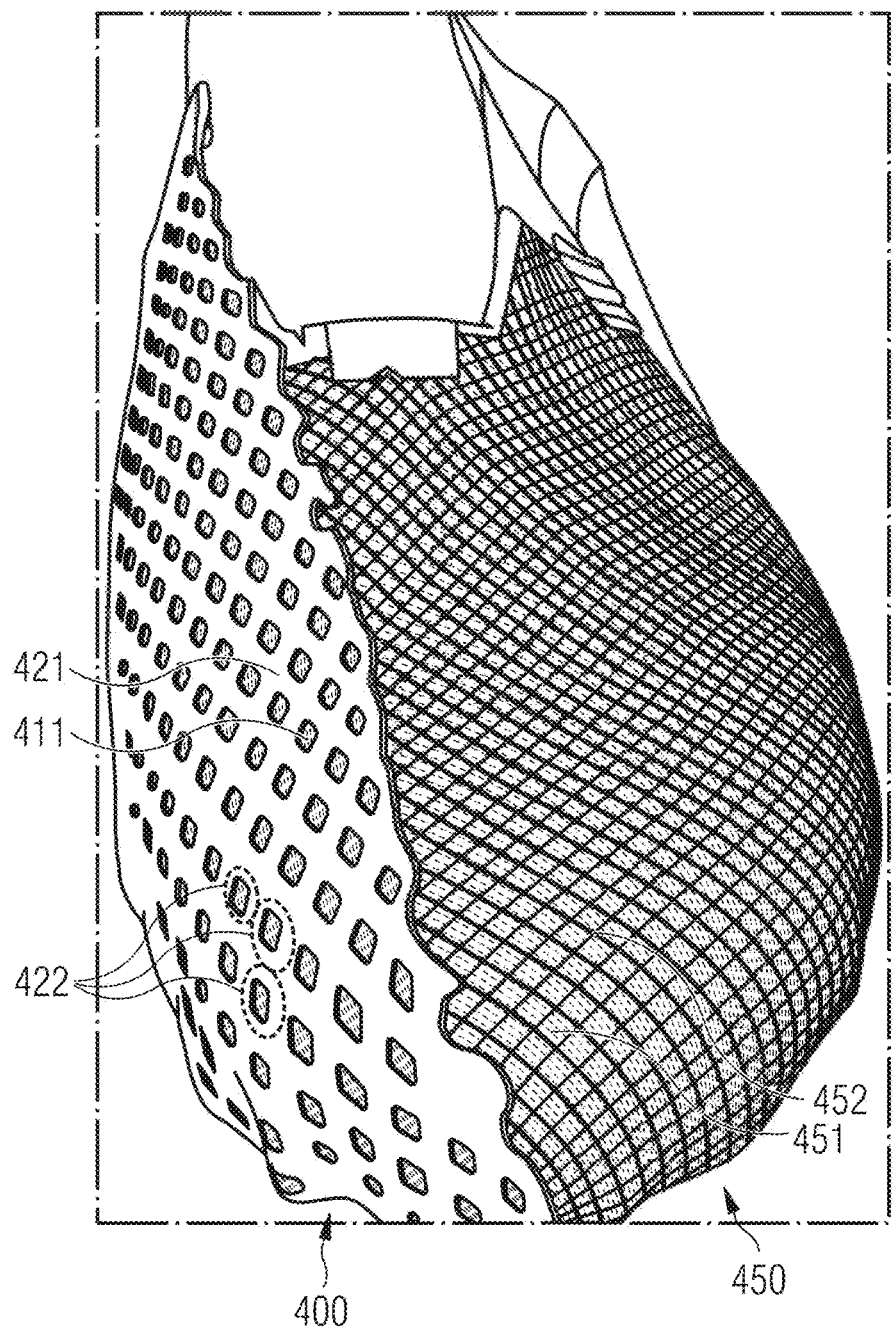
FIG. 4 shows an illustration of an upper of a shoe including a further embodiment of the present invention attached to the upper of the shoe.

FIG. 4 depicts an embodiment of abrasion resistant material attached to a medial or lateral side of an upper 450 of a shoe. This may enable to provide a shoe, in particular a sports shoe, having a higher durability and thus lasting longer by using patches of the abrasion resistant material 400 of the present invention at areas of the shoe that are more prone to higher wear and tear. In some embodiments, the outer layer of e.g. sports equipment, apparel or shoes may also include a fusible layer, as for example the first 451 and second layer 452 of upper 450, so that the abrasion resistant material 400 may be directly attached to the outer layer using heat bonding. This may provide an attachment without the need of sewing or gluing. Similar to FIG. 3, the abrasion resistant material 400 may have openings 422 in the second layer 421, so that the first layer 411 may be visible.

Figure 5:
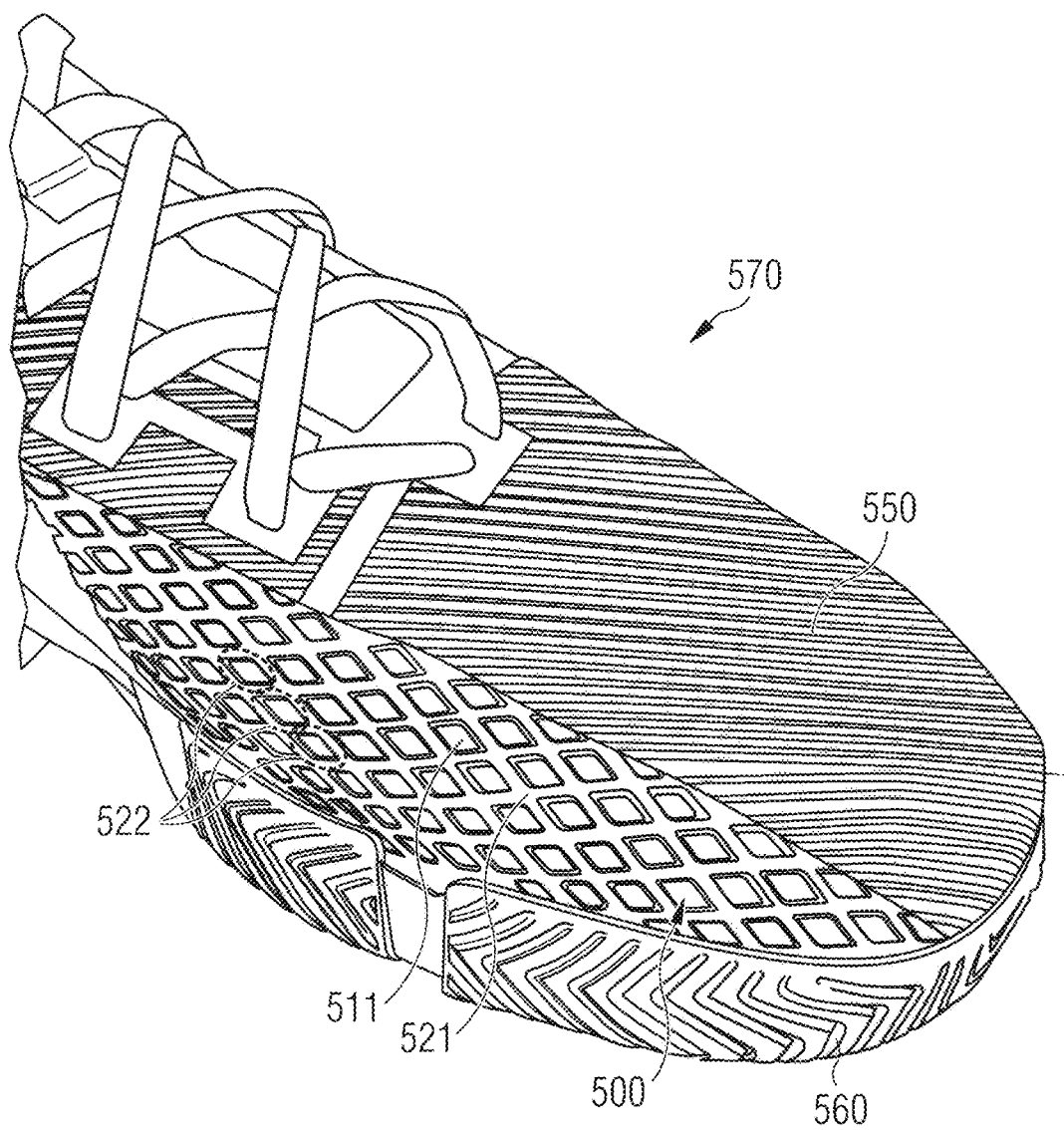
FIG. 5 shows an illustration of a shoe including an abrasion resistant material according to an embodiment of the present invention.

FIG. 5 depicts a front part of a shoe 570 having a sole 560 and the abrasion resistant material 500 attached to an upper 550 of the shoe 570. This may enable to protect regions of the shoe 570, as for example a medial and lateral forefoot region, that are exposed to a rugged usage during sports activity. It is known that for example tennis players drag their shoes frequently by sliding over the rough surface of a tennis court when trying to reach a ball. This may expose the upper 550 of a tennis shoe 570 to a high degree of abrasion, in particular when playing on a clay court. By providing such an upper 550 of a tennis shoe 570 with an abrasion resistant material 500, particularly at highly stressed regions, the overall lifetime of the shoe 570 may be prolonged. This may reduce the amount of waste and thus provide an eco-friendlier version of a shoe 570 by an attachment of the abrasion resistant material 500. In some embodiments the materials used for the production of the first yarn to manufacture the first layer 511 and the second yarn to manufacture the second layer 521 may be recycled material. The second layer 521 may comprise openings 522 which may provide an improved air permeability and ventilation through the meshes of the first layer 511 for a foot of an athlete wearing the shoe 570 comprising the abrasion resistant material 500.

In addition to the high performance of the abrasion resistant material 100, 200, 300, 400, 500 of the present invention, the abrasion resistant material may also provide a great visual appeal and the possibility to create interesting patterns and designs on e.g. sports equipment, apparel or shoes 570 by using textile materials with different colors. Further, by varying the parameters of the heat bonding, different looks and structures may easily be accomplished, for example openings 122, 222, 224, 322, 422, 522 with different sizes and shapes or similar. Furthermore, the methods described herein, may provide an abrasion resistant material 100, 200, 300, 400, 500, which in contrast to the use of an ordinary TPU foil may offer a high degree of flexibility to e.g. sports equipment, apparel or shoes when covered with the abrasion resistant material 100, 200, 300, 400, 500.

Some embodiments described herein relate to an abrasion-resistant material that includes a first layer including a first textile material, and a second layer including a second textile material, wherein the second layer is arranged on the first layer, wherein the first layer and the second layer are at least partially heat bonded to each other, wherein the first textile material exhibits a first shrinkability and the second textile material exhibits a second shrinkability, and wherein the first shrinkability is greater than the second shrinkability when at least partially heat bonding the first layer and the second layer.

In any of the various embodiments described herein, at least a part of the first layer or the second layer may be woven.

In any of the various embodiments described herein, the second textile material may melt at least partially during the heat bonding.

In any of the various embodiments described herein, the first textile material may include a first yarn and the second textile material may include a second yarn, and the first yarn may include a first thermoplastic material. In some embodiments, the first yarn may include only the first thermoplastic material.

What is claimed is:

1. A method of manufacturing an abrasion-resistant material, the method comprising:
  providing a first layer comprising a first textile material;
  providing a second layer comprising a second textile material;
  arranging the second layer on the first layer; and
  heat bonding the first layer and the second layer at least partially to each other such that the heat bonding activates a first shrinkability of the first textile material and a second shrinkability of the second textile material, wherein the heat bonding causes shrinking of the first layer or the second layer;
  wherein the first textile material exhibits the first shrinkability during the heat bonding and the second textile material exhibits the second shrinkability during the heat bonding, wherein the first shrinkability is greater than the second shrinkability, when at least partially heat bonding the first layer and the second layer, and wherein at least one selected from a group consisting of the first material and the second material is a woven fabric; and
  wherein the second layer is formed as a mesh having a mesh size, wherein the mesh is arranged in a lattice structure defining openings that are larger than the mesh size.

2. The method of claim 1, wherein the heat bonding comprises:
  applying a pressure of up to 1 bar at a temperature between 100 to 200° C. for a time duration of at least 10 seconds.

3. The method of claim 1, wherein the heat bonding comprises:
  applying a pressure of 0.5 to 0.7 bar at a temperature between 150 to 180° C. for a time duration of 20 to 40 seconds.

4. The method of claim 1, further comprising:
  inserting a non-stick protective foil between the first layer or the second layer and a heat press.

5. The method of claim 1, further comprising: removing the abrasion-resistant material from a heat press within a period shorter than 10% of the time duration of the heat bonding, after the time duration of the heat bonding expired.

6. The method of claim 1, wherein the heat bonding causes a shrinking of the first layer and the second layer.

7. The method of claim 1, wherein the heat bonding causes a first change of surface area of the first layer and a second change of surface area of the second layer, and wherein an absolute value of the first change of surface area is greater than an absolute value of the second change of surface area.

8. The method of claim 1, wherein the first textile material exhibits a first stretchability and the second textile material exhibits a second stretchability;
   wherein the first stretchability is greater than the second stretchability.

9. The method of claim 1, wherein the first material is a fabric of a thermoplastic yarn and the second material is a fabric of a yarn that includes polyester and a thermoplastic other than polyester.

10. The method of claim 1, wherein either the first material or the second material is knitted fabric.

11. The method of claim 1, comprising constructing an article of footwear comprising the heat bonded first layer and second layer, wherein the second layer is arranged externally to the first layer, and the first layer is exposed through the openings of the lattice structure of the second layer.

12. The method of claim 1, wherein:
   the heat bonding is performed on a first region wherein the first layer and second layer overlap and on a second region wherein the first layer and the second layer overlap; and
   wherein the head bonding comprises applying a different temperature or duration of heat to the first region than to the second region.

13. The method of claim 1, wherein:
   the heat bonding is performed on a first region wherein the first layer and second layer overlap and on a second region wherein the first layer and the second layer overlap; and
   wherein the first layer comprises the first material in the first region and in the second region the first layer is constructed of a different material that does not exhibit the first shrinkability.

14. A method of manufacturing an abrasion-resistant material, the method comprising:
   providing a first layer comprising a first textile material;
   providing a second layer comprising a second textile material;
   arranging the second layer on the first layer; and
   heat bonding the first layer and the second layer at least partially to each other such that the heat bonding activates a first shrinkability of the first textile material and a second shrinkability of the second textile material, wherein the heat bonding causes shrinking of the first layer or the second layer;
   wherein the first textile material exhibits the first shrinkability during the heat bonding and the second textile material exhibits the second shrinkability during the heat bonding, wherein the first shrinkability is greater than the second shrinkability, when at least partially heat bonding the first layer and the second layer, and wherein at least one selected from a group consisting of the first material and the second material is a knitted fabric; and
   wherein the second layer is formed as a mesh having a mesh size, wherein the mesh is arranged in a lattice structure defining openings that are larger than the mesh size.

15. The method of claim 14, wherein either the first material or the second material is woven fabric.

* * * * *